(12) United States Patent
Matsuo et al.

(10) Patent No.: US 7,919,050 B2
(45) Date of Patent: Apr. 5, 2011

(54) EXHAUST GAS PURIFYING APPARATUS

(75) Inventors: Yuichi Matsuo, Saitama (JP); Takeshi Mori, Saitama (JP); Atsushi Furukawa, Saitama (JP); Norihiko Suzuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1176 days.

(21) Appl. No.: 11/599,376

(22) Filed: Nov. 15, 2006

(65) Prior Publication Data

US 2007/0134138 A1 Jun. 14, 2007

(30) Foreign Application Priority Data

Dec. 14, 2005 (JP) ................................. 2005-360259

(51) Int. Cl.
*F01N 3/10* (2006.01)
*B01D 50/00* (2006.01)
(52) U.S. Cl. ............ 422/171; 422/172; 60/288; 60/297; 60/303
(58) Field of Classification Search .................. 422/168, 422/171, 172; 60/288, 297, 303
See application file for complete search history.

(56) References Cited

U.S. PATENT DOCUMENTS

| | | | |
|---|---|---|---|
| 5,943,857 A | 8/1999 | Ansell et al. | |
| 6,047,544 A * | 4/2000 | Yamamoto et al. | 60/285 |
| 6,093,378 A * | 7/2000 | Deeba et al. | 423/213.5 |
| 6,294,141 B1 | 9/2001 | Twigg et al. | |
| 6,669,913 B1 * | 12/2003 | Haberkamp | 422/180 |
| 6,877,313 B1 * | 4/2005 | Phillips et al. | 60/297 |
| 7,052,532 B1 * | 5/2006 | Liu et al. | 96/154 |
| 7,111,453 B2 * | 9/2006 | Chandler et al. | 60/288 |
| 7,211,226 B2 * | 5/2007 | Liu et al. | 422/168 |
| 7,303,603 B2 * | 12/2007 | Gregoire et al. | 55/282.3 |
| 7,356,986 B2 * | 4/2008 | Aida et al. | 60/276 |
| 7,430,857 B2 * | 10/2008 | Chandler et al. | 60/288 |
| 7,621,987 B2 * | 11/2009 | Israelson | 96/144 |
| 2006/0010854 A1 * | 1/2006 | Nakano et al. | 60/285 |
| 2006/0107649 A1 * | 5/2006 | Kamikawa et al. | 60/274 |
| 2006/0248874 A1 * | 11/2006 | Goersmann et al. | 60/274 |

FOREIGN PATENT DOCUMENTS

| | | |
|---|---|---|
| DE | 696 06 292 T2 | 6/2000 |
| JP | 63-310615 A | 12/1988 |
| JP | 4-57367 B2 | 9/1992 |
| JP | 10-159552 A | 6/1998 |
| JP | 2002-276338 A | 9/2002 |

* cited by examiner

*Primary Examiner* — N. Bhat
(74) *Attorney, Agent, or Firm* — Arent Fox, LLP (57) ABSTRACT

An exhaust gas purifying apparatus is provided for efficiently purifying particulate matter discharged from an internal combustion engine at a lower exhaust gas temperature by adequately disposing of the absorbent material for absorbing hydrocarbon, the combustion catalyst for hydrocarbon, and the combustion catalyst for particulate matter. The exhaust gas purifying apparatus disposed in an exhaust gas path of the internal combustion engine for purifying particulate matter in exhaust gas discharged from the internal combustion engine, includes a particulate filter, wherein the particulate filter has a porous wall; a first layer formed on a surface of the porous wall, including an absorbent material for absorbing hydrocarbon contained in exhaust gas; and a second layer formed on a surface of the first layer, containing a combustion catalyst for the particulate matter and a combustion catalyst for the hydrocarbon.

15 Claims, 5 Drawing Sheets

EXHAUST GAS PURIFYING APPARATUS

This application is based on and claims the benefit of priority from Japanese Patent Application No. 2005-360259, filed on 14 Dec. 2005, the content of which is incorporated herein by reference.

BACKGROUND OF THE INVENTION

1. Field of the Invention

The present invention is related to an exhaust gas purifying apparatus, in particular an exhaust gas purifying apparatus for efficiently purifying PM exhausted from an internal combustion engine such as a diesel.

2. Related Art

Exhaust gas exhausted from an internal combustion engine such as diesel contains particulate matter (hereinafter sometimes referred to as "PM"). Since it is known that PM has an adverse affect on a human body when PM is unpreferably discharged in ambient air, an exhaust gas purifying apparatus in which a particulate filter (hereinafter sometimes referred to as "DPF") or the like is installed as a filter to trap PM is installed in an exhaust system of a diesel car. PM contained in the exhaust gas is trapped when the exhaust gas passes through the DPF. Thus, PM is deposited in the DPF as time advances, so that PM has to be periodically or continuously removed from the DPF by way of some kind of methods to reproduce the DPF.

There is a general method for removing PM which is described below. In other words, the method is that fuel is regularly injected into the exhaust system (exhaust gas path), the injected fuel is burnt with an oxidation catalyst, the DPF is heated up to around the combustion temperature of PM (about 600 degrees Celsius) with combustion heat generated at this point, and PM deposited in the DPF is burnt in order to be removed.

In addition, as another method for removing PM, a method for shortening the DPF reproduction time as well as facilitating PM combustion by applying a precious metal catalyst onto the inside of the DPF and improving burning spreading as well as the ignitability of the PM is described in Japanese Patent Publication No. 4-57367 (hereinafter referred as to Patent Document 1).

However, there is a problem that both of the abovementioned methods consume fuel to burn PM so that fuel consumption deteriorates.

On the other hand, as contrasted with the method for removing PM by consuming fuel, the exhaust gas purifying apparatus, which is provided with the DPF having a so-called self-reproduction function for enabling it to burn PM by using the heat of exhaust gas and the energy that molecules in exhaust gas have been proposed. The "self-reproduction" herein means that PM deposited in the DPF is removed or reduced by not using external energy such as fuel injection, heater heat, or the like.

For example, the exhaust gas purifying apparatus in which a platinum catalyst as the first catalyst converting NO into $NO_2$ is installed in the up-stream of the exhaust gas path, and an oxidation catalyst as the second catalyst and the DPF are installed in the down-stream of the exhaust gas path is disclosed in Japanese Unexamined Patent Application Publication No. 10-159552 (hereinafter referred as to Patent Document 2). In this exhaust gas purifying apparatus described in Patent Document 2, a reaction in which NO in exhaust gas is oxygenated to generate $NO_2$ ($2NO+O_2 \rightarrow 2NO_2$, hereinafter sometimes referred to as "first reaction") occurs by the oxidation catalyst installed in the up-stream of the exhaust gas path. And then, in the down-stream of the exhaust gas path, an oxidation-reduction reaction occurs with $NO_2$ generated by the oxidization of the oxidation catalyst or existing in exhaust gas, and PM ($2NO_2+C \rightarrow 2NO+CO_2$, hereinafter sometimes referred to as "second reaction"). By this second reaction, PM is converted to carbon dioxide. Since the energy barrier of the oxidation-reduction reaction with $NO_2$ and PM is lower than that of the oxidation reaction of PM with oxygen ($O_2$), the exhaust gas purifying apparatus described in Patent Document 2 can purify PM at a lower temperature than the temperature used in the method in which PM is burnt with the abovementioned injected fuel.

In the case of the exhaust gas purifying apparatus described in Patent Document 2, PM can be burnt at a lower temperature than the temperature used in the method in which PM is burnt with the injected fuel; however, the catalyst is not activated unless exhaust gas temperature becomes higher than the required temperature (about 350 degrees Celsius). Thus, in the case of the driving state such as idling, low speed driving, and moreover driving with engine braking action in which the exhaust gas temperature is lower than the required temperature, catalyst activity becomes lower so that the reactivity of the first reaction and the second reaction becomes lower. In addition, in the case of the driving state in which NO is less exhausted, the reactivity of the second reaction becomes lower because of the lack of NO. As described above, in the case of the driving state in which the exhaust gas temperature is lower, or NO is less exhausted, there is a problem that PM cannot be removed to clog the DPF.

Alternatively, in Japanese Unexamined Patent Application Publication No. 2002-276338 (hereinafter referred as to Patent Document 3), the exhaust gas purifying apparatus provided with the continuous reproduction type DPF containing an absorbent/occlusion substance (hydrocarbon absorbent material) which absorbs and occludes a reducing agent and oxygen, a precious metal catalyst (hydrocarbon combustion catalyst) and a PM oxidation catalyst (PM combustion catalyst) is disclosed. In the exhaust gas purifying apparatus described in Patent Document 3, the absorbent/occlusion substance is absorbed and occluded when exhaust gas temperature is lower, and the reducing agent and oxygen are detached from the absorbent/occlusion substance when exhaust gas temperature is higher. The detached reducing agent reacts with oxygen by the catalytic action of the precious metal catalyst to be burnt so that combustion heat is generated, and then the PM oxidation catalyst is activated by the combustion heat. By way of the catalytic action of the activated PM oxidation catalyst, the trapped PM is oxidized (burnt) to be removed.

However, in the exhaust gas purifying apparatus provided with the continuous reproduction type DPF, the arrangement of the absorbent/occlusion substance, the PM oxidation catalyst, and the precious metal catalyst is not designed well. For example, when the PM oxidation catalyst is disposed away from the precious metal catalyst, combustion heat generated by reacting the reducing agent detached from the absorbent/occlusion substance with oxygen is not efficiently transmitted to the PM oxidation catalyst. In addition, when the absorbent/occlusion substances are allocated above the precious metal catalyst, hydrocarbon detached from the absorbent/occlusion substance does not contact with the precious metal catalyst so that hydrocarbon is hardly burnt. Furthermore, when the absorbent/occlusion substance is allocated near the PM oxidation catalyst, the absorbent/occlusion substance absorbs combustion heat generated by burning the reducing agent so that the PM oxidation catalyst is hardly heated up.

As mentioned above, in the exhaust gas purifying apparatus described in Patent Document 3, since the absorbent/occlusion substance, the precious metal catalyst and the PM oxidation catalyst are not adequately allocated, combustion heat to activate the PM oxidation catalyst is not efficiently transmitted so that the PM oxidation catalyst is hardly heated up. Therefore, exhaust gas temperature must be increased to remove PM.

SUMMARY OF THE INVENTION

The present invention has been researched vigorously to solve the problems described above; the object of the present invention is to provide an exhaust gas purifying apparatus for efficiently purifying particulate matter discharged from an internal combustion engine at a lower exhaust gas temperature by adequately allocating an absorbent material for absorbing hydrocarbon, a combustion catalyst for hydrocarbon, and a combustion catalyst for particulate matter.

As a result of vigorous efforts to achieve the objects, we have found that the abovementioned problems are solved by providing a particulate filter having a first layer including an absorbent material for absorbing hydrocarbon contained in exhaust gas, a second layer formed on a surface of the first layer, and including the combustion catalyst for hydrocarbon and the combustion catalyst for particulate matter. More specifically, the present invention provides the apparatus described below.

According to a first aspect of the present invention, the exhaust gas purifying apparatus disposed in an exhaust gas path of the internal combustion engine for purifying particulate matter in exhaust gas discharged from the internal combustion engine, includes a particulate filter, wherein the particulate filter has a porous wall, the first layer formed on the surface of the porous wall, and including an absorbent material for absorbing hydrocarbon contained in the exhaust gas, and the second layer formed on the surface of the first layer, and including the combustion catalyst for the particulate matter and the combustion catalyst for the hydrocarbon.

In the conventional particulate filter, the absorbent material for absorbing hydrocarbon, the combustion catalyst for hydrocarbon, and the combustion catalyst for particulate matter are mixed to be applied on the porous wall. Thus, when hydrocarbon in contact with the combustion catalyst for hydrocarbon is burnt, the combustion heat is partially lost as the heat capacity of the absorbent material for absorbing hydrocarbon, so that heat capacity transmitted to the combustion catalyst for particulate matter is reduced. In addition, when the absorbent material for absorbing hydrocarbon is disposed above the combustion catalyst for hydrocarbon, hydrocarbon detached from the absorbent material is not in contact with the hydrocarbon combustion catalyst for hydrocarbon so that hydrocarbon is hardly burnt. Furthermore, since the absorbent material for absorbing hydrocarbon coexists, the PM oxidation catalyst is disposed away from precious metal catalyst so that the generated combustion heat is not efficiently transmitted to the combustion catalyst for particulate matter. Thus, in the conventional particulate filter, the exhaust gas temperature had to be increased to remove PM.

Thus, in the exhaust gas purifying apparatus of the first aspect of the present invention, the first layer including the absorbent material for absorbing hydrocarbon contained in exhaust gas, and the second layer formed on the surface of the first layer and containing the combustion catalyst for particulate matter and the combustion catalyst for hydrocarbon are provided.

As a result, the absorbent material for absorbing hydrocarbon is disposed away from the combustion catalyst for particulate matter contained in exhaust gas, so that combustion heat generated by burning hydrocarbon is not lost as the heat capacity of the absorbent material for absorbing hydrocarbon.

In addition, in the exhaust gas purifying apparatus of the first aspect of the present invention, the combustion catalyst for hydrocarbon is disposed above the absorbent material for absorbing hydrocarbon so that the detached hydrocarbon efficiently comes into contact with the combustion catalyst for hydrocarbon to burn hydrocarbon. Furthermore, in the exhaust gas purifying apparatus of the first aspect of the present invention, the combustion catalyst for hydrocarbon and combustion catalyst for particulate matter are contained in the same second layer so that the generated combustion heat is efficiently transmitted to the combustion catalyst for particulate matter.

As described above, in the exhaust gas purifying apparatus of the first aspect of the present invention, the generating efficiency of the combustion heat is enhanced and the combustion heat generated by burnt hydrocarbon is efficiently transmitted to the combustion catalyst for particulate matter so that particulate matter discharged from the internal combustion engine can be efficiently purified even if exhaust gas temperature is lower.

According to a second aspect of the present invention, in the exhaust gas purifying apparatus described in the first aspect of the present invention, the combustion catalyst for the hydrocarbon is unevenly distributed in the first layer side of the second layer, and the combustion catalyst for the particulate matter is unevenly distributed in the surface side of the layer.

In the exhaust gas purifying apparatus of the second aspect of the present invention, since the combustion catalyst for particulate matter is unevenly distributed in the surface side of the second layer, the particulate matter deposited on the surface side of the second layer has higher probability for coming into contact with the combustion catalyst for particulate matter. Thus, the deposited particulate matter can be burnt effectively.

In addition, in the exhaust gas purifying apparatus of the second aspect of the present invention, the combustion catalyst for hydrocarbon is unevenly distributed in the first layer side of the second layer. The first layer formed under the second layer contains the absorbent material for absorbing hydrocarbon so that the combustion catalyst for hydrocarbon is easily in contact with hydrocarbon detached from the absorbent material. Thus, hydrocarbon is easily burnt.

As described above, in the exhaust gas purifying apparatus of the second aspect of the present invention, along with allowing for hydrocarbon to be more easily burned it also allows for the deposited particulate matter to be efficiently burned, so that the particulate matter discharged from the internal combustion engine can be efficiently purified even if exhaust gas temperature is lower.

According to a third aspect of the present invention, in the exhaust gas purifying apparatus described in the first or second aspect of the present invention, the absorbent material for absorbing the hydrocarbon is zeolite on which at least one kind of metallic element selected from the group consisting of group 1 elements such as Cs, K, Na and the like, and group 11 elements such as Cu, Ag, Au and the like is supported.

According to a fourth aspect of the present invention, in the exhaust gas purifying apparatus described in any one of the first to third aspects of the present invention, the combustion catalyst for the hydrocarbon is $Al_2O_3$ or $SiO_2$ with a higher specific surface area on which at least one kind of metallic element selected from the group consisting of Pt, Rh and Pd is supported.

According to a fifth aspect of the present invention, in the exhaust gas purifying apparatus described in any one of the first to fourth aspects of the present invention, the combustion catalyst for the particulate matter is a carrier having at least one kind of metallic element selected from the group consisting of: Fe, Co, Mn, Ni, Ag, Pd, Pt, V, W, La, Ce, Nd, Pr, Sm, Sr, and Ca, on which at least one kind of metallic element selected from the group consisting of: Cs, K, Na, Fe, Co, Mn, Ni, Ag, Pd, Pt, V, and W is supported.

According to the present invention, the generating efficiency of the combustion heat is enhanced and the combustion heat generated by burnt hydrocarbon is efficiently transmitted to the combustion catalyst for particulate matter, so that particulate matter discharged from the internal combustion engine can be efficiently purified even if exhaust gas temperature is lower.

DETAILED DESCRIPTION OF THE INVENTION

Figure 1:
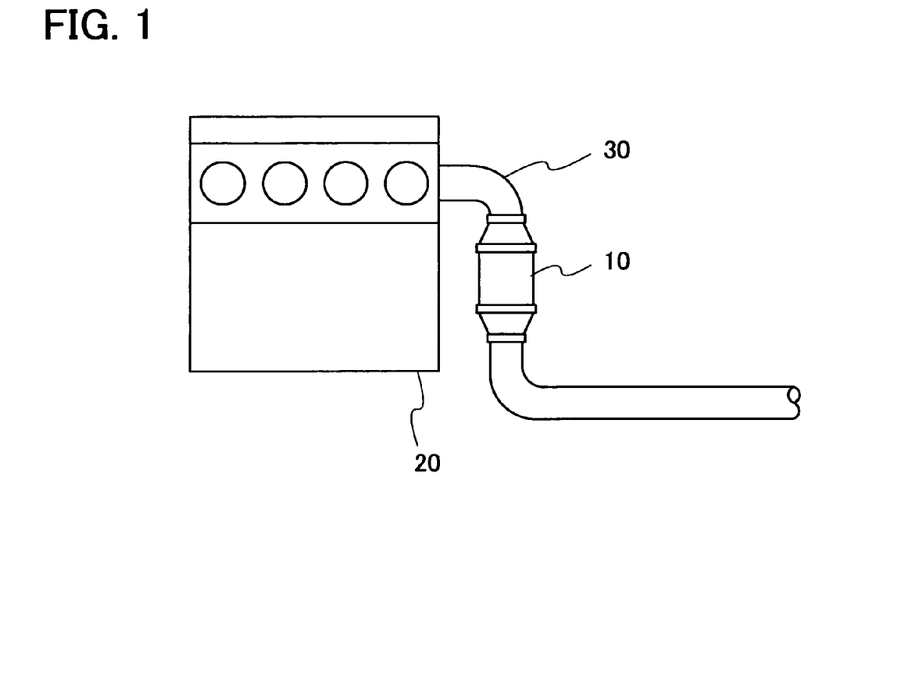
FIG. 1 shows a schematic block diagram of an internal combustion engine provided with an exhaust gas purifying apparatus according to one embodiment of the present invention.
Figure 2:
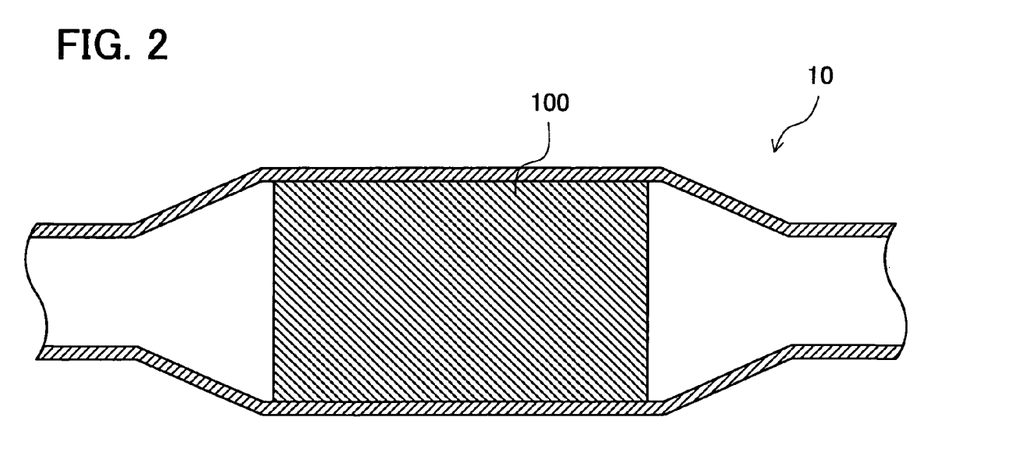
FIG. 2 shows an overall structure of the exhaust gas purifying apparatus according to one embodiment of the present invention.

One embodiment of the present invention is described with reference to the accompanying drawings.
Exhaust Gas Purifying Apparatus FIG. 1 shows a schematic block diagram of the internal combustion engine provided with an exhaust gas purifying apparatus 10 (in which particulate filter 100 was installed) according to one embodiment of the present invention. FIG. 2 shows the overall structure of the exhaust gas purifying apparatus according to one embodiment of the present invention. As shown in FIG. 1, this exhaust gas purifying apparatus 10 is disposed at exhaust gas path 20 (hereinafter sometimes referred to as "exhaust pipe") of the internal combustion engine (hereinafter sometimes referred to as "engine"), and purifies particulate matter (PM), hydrocarbon, and the like in exhaust gas discharged from the engine 20.

The exhaust gas purifying apparatus 10 has the particulate filter 100 (hereinafter sometimes referred to as "PM filter") for purifying PM in exhaust gas discharged from the engine 20 (see FIG. 2). The PM filter 100 is described below.

An engine 20 is preferably a diesel engine. However, the applicability of the exhaust purifying apparatus of the present invention is not limited to a diesel engine, so that it is applicable for a gasoline engine with a technique in which fuel is directly injected in the combustion chamber. In addition, the present invention is applicable for propulsion engine for a watercraft such as an outboard motor in which a crankshaft is installed in vertical direction.

Figure 3:
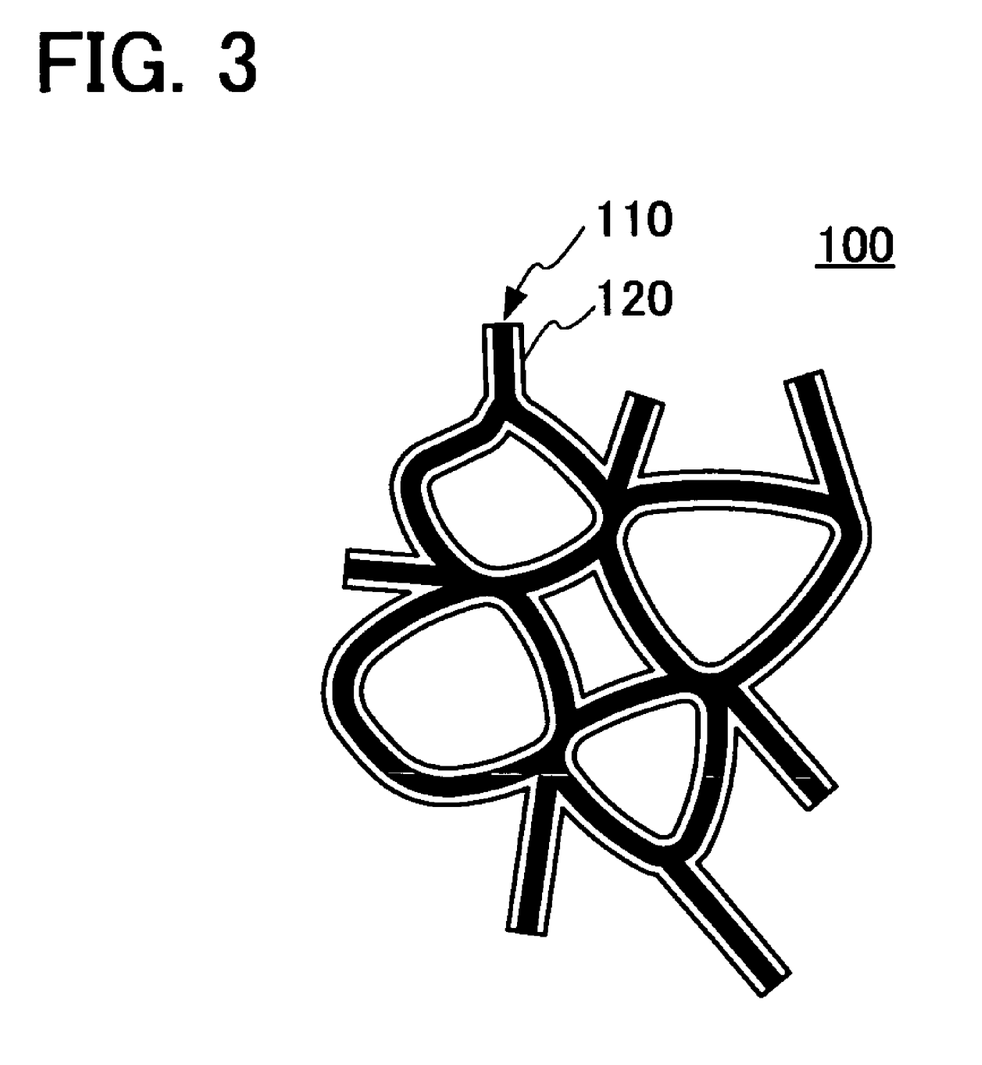
FIG. 3 is a partial sectional view of a particulate filter (PM filter)

An exhaust pipe 30 discharges exhaust gas exhausted from the engine 20 via the exhaust gas purifying apparatus 10. PM filter The PM filter 100 is described with reference to FIG. 3. FIG. 3 is a partial sectional view of the PM filter 100. As shown in FIG. 3, the PM filter 100 has a porous wall 110 and a catalyst layer 120.

In the PM filter 100, catalyst layer 120 is applied on a surface of the porous wall 110. The structure of the PM filter 100, that is the structure of the porous wall 110 is not limited in particular, and may be a three-dimensional network structure like one embodiment of this present invention or a structure which may be a honeycomb structure, in which both end faces are alternately mesh-sealed. Furthermore, it may be a structure in which a fibrous material is multiply laminated to be formed in the form of felt.

Figure 4:
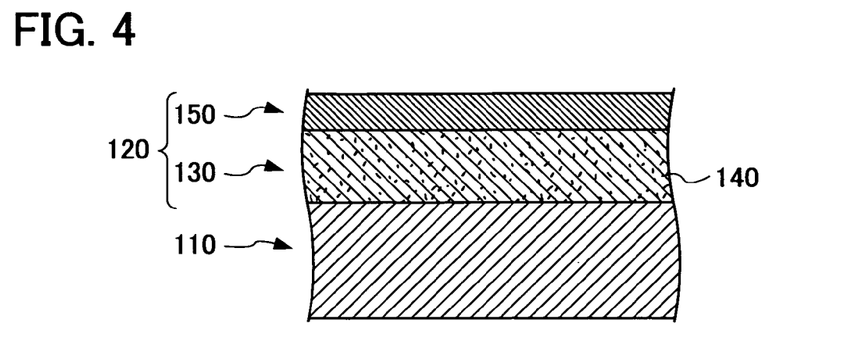
FIG. 4 is a partially enlarged sectional view of the PM filter.

The materials of the porous wall 110 are not limited in particular. For example, it may be of stainless-steel, cordierite, alumina, or the like. For the porous wall 110, a three-dimensional network structure is preferably employed as the structure, and stainless-steel is preferred as the material.
Catalyst Layer The porous wall 110 and the catalyst layer 120 are described with reference to FIG. 4. FIG. 4 is a partially enlarged sectional view of the PM filter 100. As shown in FIG. 4, the catalyst layer 120 contains a first layer 130 formed on the surface of the porous wall 110, and a second layer 150 formed on the surface of the first layer 130.
First Layer and Absorbent Material for Absorbing Hydrocarbon The First layer 130 includes the absorbent material absorbing hydrocarbon (herein after referred to as "hydrocarbon absorbent material") 140 contained in exhaust gas. A hydrocarbon absorbent material 140 is a carrier on which a metallic element is supported.

The metallic element supported onto the carrier is at least one kind of metallic element selected from the group consisting of Cs, K, and Na, which are alkali metals, and Cu, Ag, and Au which are copper group metals. The reason why these metallic elements are selected as metallic elements supported on zeolite is described below. The metallic element is coordinated at the acid site of zeolite by ion exchange so that hydrocarbon can be retained by chemical adsorption as well as physical adsorption. Therefore, hydrocarbon is not only retained at a higher temperature, but also the desorption temperature of hydrocarbon can be controlled by changing kinds of metallic element.

The carrier on which the metallic element is supported is zeolite, silica, or silica alumina; however, zeolite is preferred. Depending on the structure, there are beta type zeolites, mordenite type zeolites, MFI type zeolites, and Y type zeolites; however, a Y type zeolite is preferred. The reason why the Y type is preferred as a zeolite is described below. The Y type zeolite has larger porous size than any other types of zeolite do, so that it can efficiently absorb highly polymerized hydrocarbon. In addition, another reason why type Y is preferred, is that the Y type zeolite has mesopores as well as macropores, so that it can absorb the broaden range of the molecular weight of hydrocarbon. The zeolite on which a metallic element is supported may have one type of zeolite from the group consisting of: beta type zeolites, mordenite type zeolites, MFI type zeolites, and Y types, and may be multiple types thereof.

The applied amount of the hydrocarbon absorbent material 140 is preferably 50 to 200 g per 1 liter to the volume of the PM filter 100. In cases in which the amount is less than 50 g, a calorific value on burning is not sufficient, while in cases in which the amount is more than 200 g, filter pores are confined causing a pressure drop buildup problem. The applied amount of the hydrocarbon absorbent material is preferably 80 to 150 g.

Second Layer

The second layer 150 contains the combustion catalyst for particulate matter (PM) (hereinafter sometimes as to "PM combustion catalyst") and the combustion catalyst for hydrocarbon (hereinafter referred as to "hydrocarbon combustion catalyst"). As discussed below, the hydrocarbon combustion catalyst is unevenly distributed in the first layer 130 side of the second layer 150, and the combustion catalyst for particulate matter is unevenly distributed in the surface side of the second layer 150.

PM Combustion Catalyst

The particulate combustion catalyst is a carrier having at least one kind of metallic element selected from the group consisting of: Fe, Co, Mn, Ni, Ag, Pd, Pt, V, W, La, Ce, Nd, Pr, Sm, Sr, and Ca, on which at least one kind of metallic element selected from the group consisting of: Cs, K, Na, Fe, Co, Mn, Ni, Ag, Pd, Pt, V, and W is supported.

An alkali metal such as Cs, K and Na is used as the metallic element supported by the carrier having the metallic element because of the two reasons described below. The first reason is that the withdrawal action of hydrogen from the hydrocarbonaceous surface existing on the PM surface is promoted due to the basicity of the alkali metal element, so that the breaking activity of the carbon-to-carbon bond becomes higher by withdrawing this hydrogen. In addition to this reason, the oxidation reaction of PM is promoted so that hydrocarbon is decomposed when an alkali metal is used. The second reason is that the melting point of the alkali metal is lower, which means that the mobility is higher, so that the alkali metal actively acts to PM in a solid form so as to enhance the oxidation reaction of PM.

At least one kind of element selected from the group consisting of: Fe, Co, Mn, Ni, Ag, Pd, Pt, V, and W is used as the metallic element supported by the carrier, having a metallic element because of the reason described below. The reason is that Fe, Co, Mn, Ni, Ag, Pd, Pt, V and W are elements with higher oxidative activity than that of transition metal elements, so that the transition metal element cooperates with an alkali metal that withdraws hydrogen to accelerate the oxidation of the transition metal element attacking carbon when the transition metal element is used together with an alkali metal element.

The applied amount of the PM combustion catalyst is preferably 50 to 150 g per 1 liter to the volume of the PM filter 100. In cases in which the amount is less than 50 g, the contact point of PM is not enough to efficiently burn PM, and in cases in which the amount is more than 150 g, filter pores are confined causing a pressure drop buildup problem. The applied amount of the PM combustion catalyst is preferably 80 to 120 g.

Hydrocarbon Combustion Catalyst

The hydrocarbon combustion catalyst is $Al_2O_3$ or $SiO_2$ on which at least one kind of metallic element is selected from the group consisting of Pt, Rh and Pd. The reason why at least one kind of element selected from the group consisting of Pt, Rh and Pd is used, is that the low temperature combustion activity of the gaseous hydrocarbon is higher. In addition, as the carriers, $Al_2O_3$ and $SiO_2$ with high specific surface area are preferred. Since $Al_2O_3$ and $SiO_2$ have a high specific surface area, Pt, Ph, and Pd are supported in high dispersion to increase the low temperature combustion efficiency.

The applied amount of the hydrocarbon combustion catalyst is preferably 30 to 100 g per 1 liter to the volume of the PM filter 100. In cases in which the amount is less than 30 g, sufficient hydrocarbon burning activity is not obtained, while in cases in which the amount is more than 100 g, the filter pores are confined to causing a pressure drop buildup problem. The applied amount of hydrocarbon combustion catalyst is preferably 50 to 80 g. In addition, the ratio of the precious metals, Pt, Ph and Pd to $Al_2O_3$ or $SiO_2$ is preferably from 1:10 to 1:100. In cases in which the ratio is less than 1:10, the precious metal dispersion becomes worse, while in cases in which the ratio is more than 1:100, the catalyst amount increases too much.

Method for Applying Hydrocarbon Absorbent Material, Hydrocarbon Combustion Catalyst, and PM Combustion Catalyst A method for applying the hydrocarbon absorbent material, the hydrocarbon combustion catalyst, and the PM combustion catalyst onto the filter wall includes a method in which water or the like is contained in a catalyst powder in order to form a slurry, the slurry is applied onto the filter wall and the upper part of the catalyst layer, and is fired. In the present invention, it is desirable to have the catalyst coat layer divided into two layers, so that it is fired after the first layer and the second layer are each applied.

Operation of Exhaust Gas Purifying Apparatus According to the Present Invention

Figure 5:
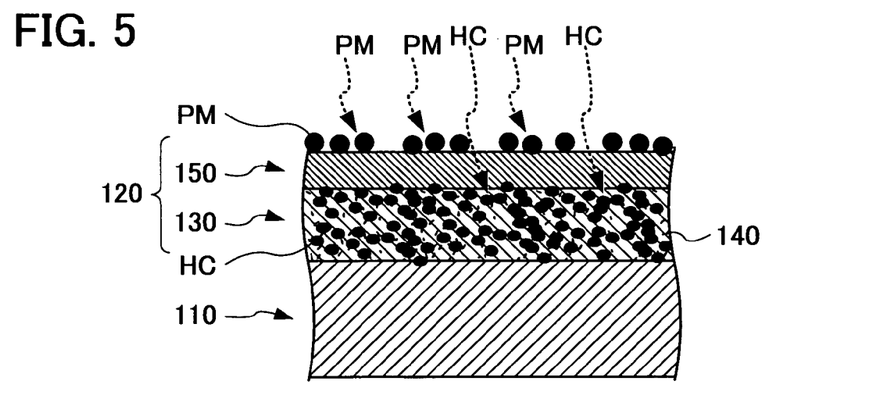
FIG. 5 is a schematic cross-sectional view of the PM filter, illustrating that PM is trapped and hydrocarbon is absorbed.
Figure 6:
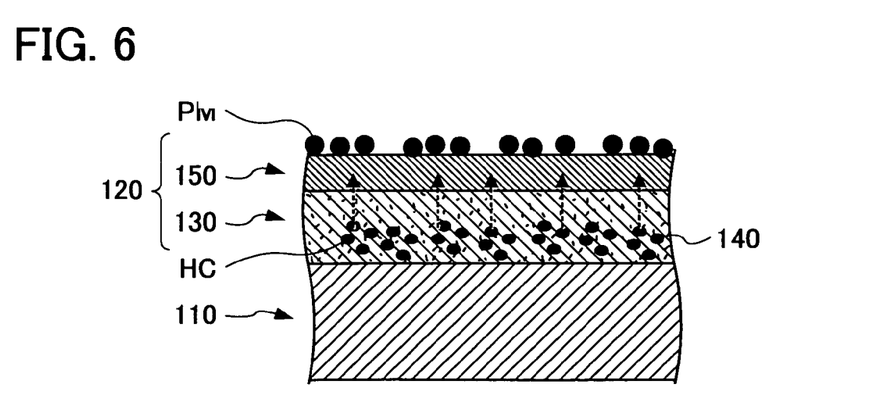
FIG. 6 shows the schematic cross-sectional view, illustrating that absorbed hydrocarbon is detached.
Figure 7:
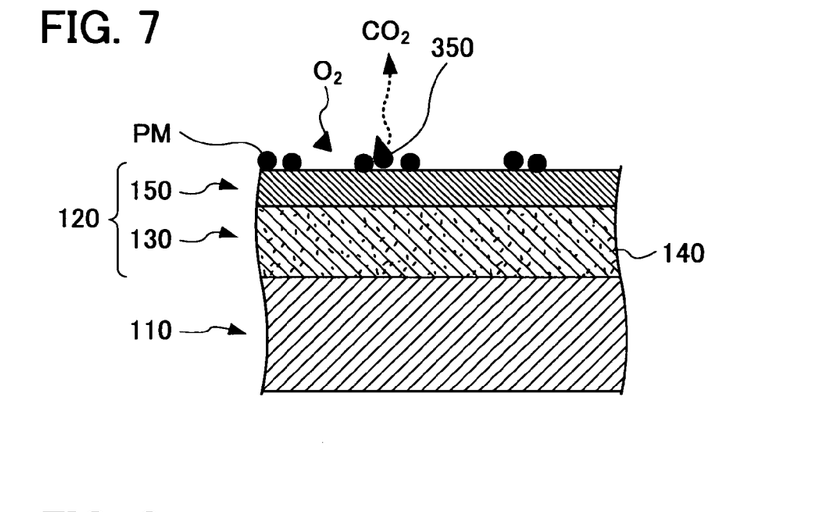
FIG. 7 shows the schematic cross-sectional view, illustrating that PM is burnt.
Figure 8:
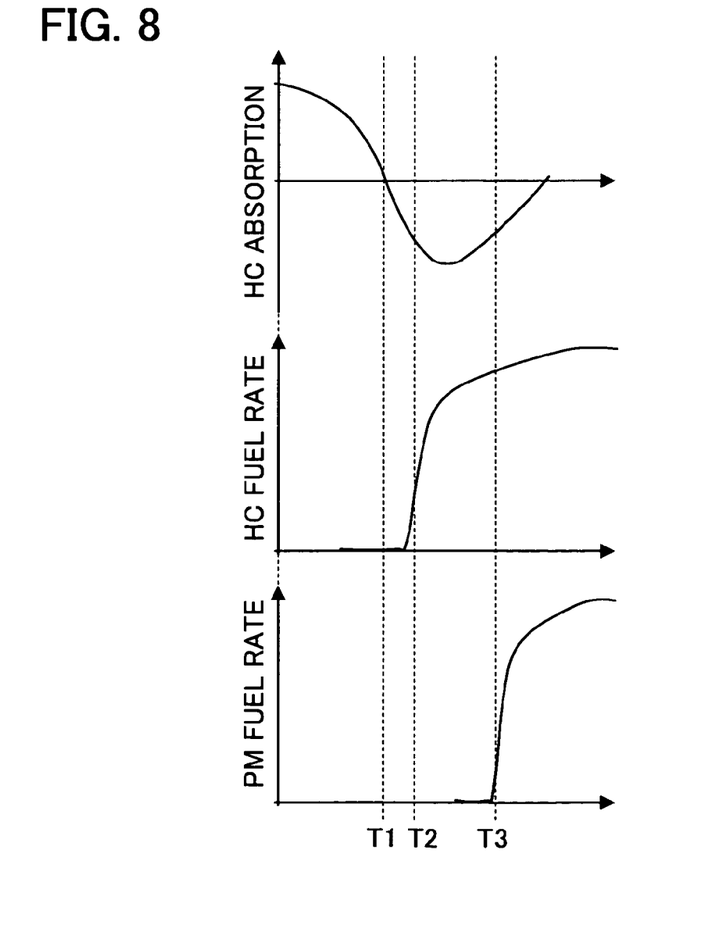
FIG. 8 is a chart illustrating the characteristics of hydrocarbon HC absorption, HC combustion rate, and PM combustion rate to temperature.

The operation of the exhaust gas purifying apparatus according to the present invention is described by using FIGS. 1, 3, and 5 to 8. FIGS. 5 to 7 are schematic cross-sectional views of a DPF for describing the mechanism in which PM is burnt. FIG. 8 is a chart illustrating the characteristics of hydrocarbon (HC) absorption, HC combustion rate, and PM combustion rate to temperature.

When the engine 20 starts, exhaust gas is discharged from the engine 20 (See FIG. 1). Hydrocarbon, PM, $NO_x$, and the like are contained in this exhaust gas. As PM is gradually deposited on the surface of the catalyst layer 120 of the PM filter 100, hydrocarbon (HC) is absorbed in the hydrocarbon absorbent material 140 of the first layer 130 of the PM filter 100, as shown in FIG. 5.

When exhaust gas from engine 20 is heated up (see FIG. 8 (T=T1)) as time passes, the hydrocarbon absorbent material 140 detaches hydrocarbon rather than absorbing it, so that the amount of hydrocarbon detached from the hydrocarbon absorbent material 140 gradually becomes more than that of the hydrocarbon absorbed in the hydrocarbon absorbent material 140. (See FIG. 6).

When the exhaust gas becomes more than the predetermined temperature (see FIG. 8 (T=T2)), the detached hydrocarbon comes into contact with the hydrocarbon combustion catalyst which starts burning. The combustion heat generated by burning the hydrocarbon combustion catalyst is circumferentially spread to be transmitted. In particular, by the transmitted combustion heat the temperature of the PM combustion catalyst which is unevenly distributed in the surface side of the second layer 150 is increased. When the PM combustion catalyst is heated up beyond the active temperature (see FIG. 8 (T=T3)), the deposited PM reacts with oxygen (see FIG. 7) which starts burning by way of the catalyst action of the PM combustion catalyst.

In the case described above, the relationship among the upper limit T1 of the adsorption temperature of the hydrocarbon absorbent material 140, the combustion starting temperature T2 of the hydrocarbon (in the hydrocarbon combustion catalyst), and the combustion starting temperature T3 of the PM (of the PM combustion catalyst) are important, and T1≈T2<T3, ΔT>T3−T2 is preferred.

EXAMPLES

The present invention will be explained more specifically with reference to the examples, which are not intended to limit the scope of the present invention.

PM Filter

As the PM filter, a filter in a three dimensional network structure having about 1 mm pores formed by cordierite was prepared. In addition, as the hydrocarbon absorbent material, Y type zeolite (Ag/Y type zeolite) on which silver was supported was provided. As the hydrocarbon combustion catalyst, alumina catalyst ($Pd/Al_2O_3$) on which palladium was supported was prepared. As the PM combustion catalyst, a manganic acid lanthanum ($Cs/LaMnO_3$) on which cesium and silver was supported was provided.

The method for preparing the hydrocarbon absorbing agent (Ag/Y type zeolite) is described below. The Y type zeolite manufactured TOSOH CORPORATION was prepared. A predetermined amount of silver nitrate was dissolved in water to prepare a silver nitrate water solution. To support the silver on the Y type zeolite, Y type zeolite was impregnated in the silver nitrate water solution, and then the solution was dried at 200 degrees Celsius. The dried powder was baked at 700 degrees Celsius to prepare an Ag/Y type zeolite.

A method for preparing the hydrocarbon combustion catalyst ($Pd/Al_2O_3$) is described below. $Al_2O_3$ manufactured by Sumitomo Chemical Co., Ltd was used. A predetermined amount of palladium nitrate was dissolved in water to prepare a palladium nitrate water solution. To support palladium on $Al_2O_3$ was impregnated in the palladium nitrate water solution, and then the solution was dried at 200 degrees Celsius. The dried powder was baked at 700 degrees Celsius to prepare $Pd/Al_2O_3$.

The Method for Preparing the PM Combustion Catalyst ($Cs/LaMnO_3$) is described below. First, a predetermined amount of lanthanum nitrate and manganese nitrate were dissolved in water to prepare a mixed water solution. The mixed water solution was heated at around 250 degrees Celsius to evaporate the water. The remains after evaporation were baked at 800 degrees Celsius for 10 hours in a heating furnace to prepare a $LaMnO_3$ powder. A cesium carbonate was sufficiently mixed with this powder in a mortar and the mixture was baked at 800 degrees Celsius for 4 hours in a heating furnace to obtain the PM combustion catalyst.

A method for applying the hydrocarbon absorbent material (Ag/Y type zeolite), the hydrocarbon combustion catalyst ($Pd/Al_2O_3$), and the PM combustion catalyst ($Cs/LaMnO_3$) onto the PM filter is described below.

Applying First Layer (Hydrocarbon Absorbent Material)

The PM filter in a three dimensional network structure having about 1 mm pores formed by cordierite was prepared. The hydrocarbon absorbent material, water, a silica binder, and alumina balls were put in a container, and then mixed with a ball mill for 12 hours to prepare a slurry. The PM filter was immersed in this slurry and pulled out from the slurry, and then a surplus of the slurry was removed by way of air blow, and the PM filter was dried at 150 degrees Celsius for 2 hours. This operation was repeated until the hydrocarbon absorbent material was 100 g per 1 liter of the PM filter, and then the PM filter was fired at 700 degrees Celsius for 2 hours to obtain the PM filter on which the first layer was applied.

Applying First Layer (Hydrocarbon Combustion Catalyst and PM Combustion Catalyst)

The hydrocarbon combustion catalyst and PM combustion catalyst, of which the weight ratio is 2:3, water, a silica binder, and alumina balls were put in a container, and then mixed with a ball mill for 12 hours to prepare a slurry. The PM filter on which the first layer was supported was immersed in this slurry and pulled out from the slurry, and then surplus of the slurry was removed by way of air blow, and the PM filter was dried at 150 degrees Celsius for 2 hours. This operation was repeated until the hydrocarbon combustion catalyst and the PM combustion catalyst were 150 g per 1 liter of the particulate filter, and then the PM filter was fired at 700 degrees Celsius for 2 hours to obtain the PM filter on which the first and second layers were applied.

EXAMPLE

To reproduce the state of the PM filter after driving at a low temperature, the exhaust gas purifying apparatus provided with the PM filter in the downstream of the exhaust pipe of the diesel engine was installed, and exhaust gas was circulated in about 150 degrees Celsius of exhaust gas temperature. Then, the exhaust gas purifying apparatus was taken off from the exhaust pipe of the diesel engine, a blower which can send model gas was installed in the exhaust gas purifying apparatus, and the combustion completion temperature that was the temperature at which PM was completely burnt was determined as described below. The burned amount of PM was estimated by the reduction of pressure loss while the temperature of the exhaust gas purifying apparatus was increased at 20 degrees Celsius/min with a warmer under model gas circulating. The inlet gas temperature at the point in time when pressure loss was not reduced by PM burning and became constant was determined as the combustion completion temperature.

Comparative Example 1

Without Hydrocarbon Absorbent Material

The combustion completion temperature was determined in the same manner as Example, except that the hydrocarbon absorbent material (Ag/Y type zeolite) was not applied onto the PM filter.

Comparative Example 2

Without Hydrocarbon Combustion Catalyst

The combustion completion temperature was determined in the same manner as Example, except that the hydrocarbon combustion catalyst ($Pd/Al_2O_3$) was not applied onto the PM filter.

Comparative Example 3

Without PM Combustion Catalyst

The combustion completion temperature was determined in the same manner as Example, except that the PM combustion catalyst ($Cs/LaMnO_3$) was not applied onto the PM filter.

Comparative Example 4

Mixing Hydrocarbon Absorbent Material, Hydrocarbon Combustion Catalyst, and PM Combustion Catalyst to be Applied The combustion completion temperature was determined in the same manner as the Example, except that the mixture of the hydrocarbon absorbent material (Ag/Y type zeolite), hydrocarbon combustion catalyst (Pd/Al$_2$O$_3$), and PM combustion catalyst (Cs/LaMnO$_3$) are applied without being applied in order.

Comparative Example 5

Al$_2$O$_3$+Pt+SiO$_2$

The PM filter was prepared by the method disclosed in Patent Document 3. Al$_2$O$_3$ (manufactured by Sumitomo Chemical Co., Ltd), SiO$_2$ (manufactured by Sumitomo Chemical Co., Ltd), platinum nitrate, water, a silica binder, and alumina balls absorbent were put in a container, and then mixed with a ball mill for 12 hours to prepare a slurry. The PM filter was immersed in this slurry and pulled out from the slurry, and then surplus of the slurry was removed by way of air blow, and the PM filter was dried at 150 degrees Celsius for 2 hours. This operation was repeated until Al$_2$O$_3$, Pt, and SiO$_2$ were 100 g per 1 liter of the PM filter, and then the PM filter was fired at 700 degrees Celsius for 2 hours to obtain the PM filter. The combustion completion temperature was determined in the same manner as Example except this.

Figure 9:
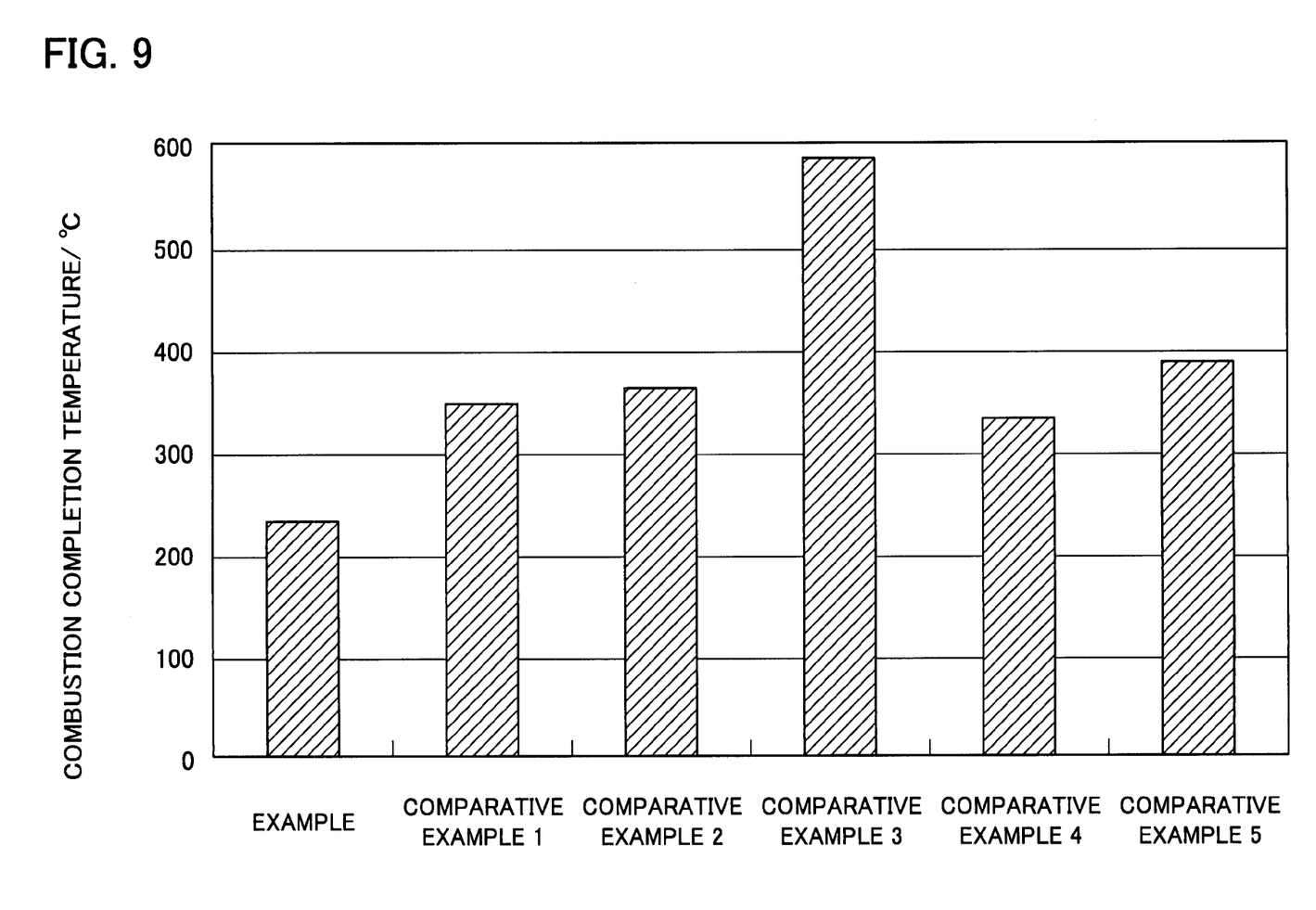
FIG. 9 shows a combustion completion temperature determined in Example and Comparative Examples.

FIG. 9 shows the combustion completion temperature determined in Example and Comparative Examples. In addition, Table 1 shows the hydrocarbon absorbent material, the hydrocarbon combustion catalyst, and the PM combustion catalyst in Example and Comparative Examples. Furthermore, Table 2 shows the upper limit T1 of the adsorption temperature of the hydrocarbon absorbent material, the hydrocarbon combustion starting temperature (T2) of the hydrocarbon combustion catalyst, and the PM combustion starting temperature (T3) of the PM combustion catalyst in the Example.

TABLE 1

| | Hydrocarbon absorbent material | Hydrocarbon combustion catalyst | PM combustion catalyst |
|---|---|---|---|
| Example | Ag/Y type zeolite | Pd/Al$_2$O$_3$ | Cs/LaMnO$_3$ |
| Comparative Example 1 | None | Pd/Al$_2$O$_3$ | Cs/LaMnO$_3$ |
| Comparative Example 2 | Ag/Y type zeolite | None | Cs/LaMnO$_3$ |
| Comparative Example 3 | Ag/Y type zeolite | Pd/Al$_2$O$_3$ | None |
| Comparative Example 4 | Ag/Y type zeolite + Pd/Al$_2$O$_3$ + Cs/LaMnO$_3$ | | |
| Comparative Example 5 | SiO$_2$ + Pt + CeO$_2$ | | |

TABLE 2

| Material | Substance | | Temperature/ degrees Celsius |
|---|---|---|---|
| Hydrocarbon absorbent material | Sg/Y type zeolite | T1 | 202 |
| Hydrocarbon combustion catalyst | Pd/Al$_2$O$_3$ | T2 | 210 |
| PM combustion catalyst | Cs/LaCoO$_3$ | T3 | 320 |

As shown in FIG. 9, the combustion completion temperature was about 230 degrees Celsius, which was lower than the other Comparative Examples 1 to 5. Particularly, when comparing Comparative Example 4 in which the mixture of the hydrocarbon absorbent material (Ag/Y type zeolite), hydrocarbon combustion catalyst (Pd/Al$_2$O$_3$), and PM combustion catalyst (Cs/LaMnO$_3$) are applied, there is a 100 degrees Celsius difference between the Example and Comparative Example 4, resulting in PM that was burnt at an even lower temperature, by the arrangement of the hydrocarbon absorbent material (Ag/Y type zeolite), the hydrocarbon combustion catalyst (Pd/Al$_2$O$_3$), and the PM combustion catalyst (Cs/LaMnO$_3$). In other words, it was ascertained that the arrangement relationship of each of the hydrocarbon absorbent material, the hydrocarbon combustion catalyst, and the PM combustion catalyst was significant.

In addition, Table 2 shows T1=202 degrees Celsius, T2=210 degrees Celsius, T3=320 degrees Celsius, which satisfied T1≈T2<T3, ΔT>T3−T2 in the Example, so that it was ascertained that the arrangement relationship of each of the hydrocarbon absorbent material, the hydrocarbon combustion catalyst, and the PM combustion catalyst was significant.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. An exhaust gas purifying apparatus disposed in an exhaust gas path of an internal combustion engine for purifying particulate matter in exhaust gas discharged from the internal combustion engine, comprising a particulate filter,
   wherein the particulate filter has a porous wall;
   a first layer formed on a surface of the porous wall, including an absorbent material for absorbing hydrocarbon contained in the exhaust gas; and
   a second layer formed on a surface of the first layer, including a combustion catalyst for the particulate matter and a combustion catalyst for the hydrocarbon; and
   wherein the combustion catalyst for the hydrocarbon is unevenly distributed in the first layer side of the second layer, and the combustion catalyst for the particulate matter is unevenly distributed in the surface side of the second layer.

2. The exhaust gas purifying apparatus according to claim 1, wherein the absorbent material for absorbing the hydrocarbon is zeolite, on which at least one kind of metallic element selected from the group consisting of group 1 and group 11 elements is supported.

3. The exhaust gas purifying apparatus according to claim 2, wherein the combustion catalyst for the hydrocarbon is a large specific surface of Al$_2$O$_3$ or SiO$_2$, on which at least one kind of metallic element selected from the group consisting of: Pt, Rh and Pd is supported.

4. The exhaust gas purifying apparatus according to claim 3, wherein the combustion catalyst for the particulate matter is a carrier having at least one kind of metallic element selected from the group consisting of: Fe, Co, Mn, Ni, Ag, Pd, Pt, V, W, La, Ce, Nd, Pr, Sm, Sr, and Ca, on which at least one kind of metallic element selected from the group consisting of: Cs, K, Na, Fe, Co, Mn, Ni, Ag, Pd, Pt, V, and W is supported.

5. The exhaust gas purifying apparatus according to claim 2, wherein the combustion catalyst for the particulate matter is a carrier having at least one kind of metallic element selected from the group consisting of: Fe, Co, Mn, Ni, Ag, Pd, Pt, V, W, La, Ce, Nd, Pr, Sm, Sr, and Ca, on which at least one kind of metallic element selected from the group consisting of: Cs, K, Na, Fe, Co, Mn, Ni, Ag, Pd, Pt, V, and W is supported.

6. The exhaust gas purifying apparatus according to claim 1, wherein the absorbent material for absorbing the hydrocarbon is zeolite, on which at least one kind of metallic element selected from the group consisting of group 1 and group 11 elements is supported.

7. The exhaust gas purifying apparatus according to claim 6, wherein the combustion catalyst for the hydrocarbon is a large specific surface of $Al_2O_3$ or $SiO_2$, on which at least one kind of metallic element selected from the group consisting of: Pt, Rh and Pd is supported.

8. The exhaust gas purifying apparatus according to claim 7, wherein the combustion catalyst for the particulate matter is a carrier having at least one kind of metallic element selected from the group consisting of: Fe, Co, Mn, Ni, Ag, Pd, Pt, V, W, La, Ce, Nd, Pr, Sm, Sr, and Ca, on which at least one kind of metallic element selected from the group consisting of: Cs, K, Na, Fe, Co, Mn, Ni, Ag, Pd, Pt, V, and W is supported.

9. The exhaust gas purifying apparatus according to claim 6, wherein the combustion catalyst for the particulate matter is a carrier having at least one kind of metallic element selected from the group consisting of: Fe, Co, Mn, Ni, Ag, Pd, Pt, V, W, La, Ce, Nd, Pr, Sm, Sr, and Ca, on which at least one kind of metallic element selected from the group consisting of: Cs, K, Na, Fe, Co, Mn, Ni, Ag, Pd, Pt, V, and W is supported.

10. The exhaust gas purifying apparatus according to claim 1, wherein the combustion catalyst for the hydrocarbon is a large specific surface of $Al_2O_3$ or $SiO_2$, on which at least one kind of metallic element selected from the group consisting of: Pt, Rh and Pd is supported.

11. The exhaust gas purifying apparatus according to claim 10, wherein the combustion catalyst for the particulate matter is a carrier having at least one kind of metallic element selected from the group consisting of: Fe, Co, Mn, Ni, Ag, Pd, Pt, V, W, La, Ce, Nd, Pr, Sm, Sr, and Ca, on which at least one kind of metallic element selected from the group consisting of: Cs, K, Na, Fe, Co, Mn, Ni, Ag, Pd, Pt, V, and W is supported.

12. The exhaust gas purifying apparatus according to claim 1, wherein the combustion catalyst for the hydrocarbon is a large specific surface of $Al_2O_3$ or $SiO_2$, on which at least one kind of metallic element selected from the group consisting of: Pt, Rh and Pd is supported.

13. The exhaust gas purifying apparatus according to claim 12, wherein the combustion catalyst for the particulate matter is a carrier having at least one kind of metallic element selected from the group consisting of: Fe, Co, Mn, Ni, Ag, Pd, Pt, V, W, La, Ce, Nd, Pr, Sm, Sr, and Ca, on which at least one kind of metallic element selected from the group consisting of: Cs, K, Na, Fe, Co, Mn, Ni, Ag, Pd, Pt, V, and W is supported.

14. The exhaust gas purifying apparatus according to claim 1, wherein the combustion catalyst for the particulate matter is a carrier having at least one kind of metallic element selected from the group consisting of: Fe, Co, Mn, Ni, Ag, Pd, Pt, V, W, La, Ce, Nd, Pr, Sm, Sr, and Ca, on which at least one kind of metallic element selected from the group consisting of: Cs, K, Na, Fe, Co, Mn, Ni, Ag, Pd, Pt, V, and W is supported.

15. The exhaust gas purifying apparatus according to claim 1, wherein the combustion catalyst for the particulate matter is a carrier having at least one kind of metallic element selected from the group consisting of: Fe, Co, Mn, Ni, Ag, Pd, Pt, V, W, La, Ce, Nd, Pr, Sm, Sr, and Ca, on which at least one kind of metallic element selected from the group consisting of: Cs, K, Na, Fe, Co, Mn, Ni, Ag, Pd, Pt, V, and W is supported.

* * * * *